(12) United States Patent  (10) Patent No.: US 7,676,316 B2
Lunati et al.  (45) Date of Patent: Mar. 9, 2010

(54) METHODS FOR OPTIMIZING THE OPERATION PARAMETERS OF A COMBUSTION ENGINE

(75) Inventors: Alain Lunati, La Fare les Oliviers (FR); Johan Fournel, Robion (FR)

(73) Assignee: SP3H (FR)

( * ) Notice: Subject to any disclaimer, the term of this patent is extended or adjusted under 35 U.S.C. 154(b) by 133 days.

(21) Appl. No.: 11/884,375

(22) PCT Filed: Mar. 21, 2006

(86) PCT No.: PCT/FR2006/000616
§ 371 (c)(1),
(2), (4) Date: Sep. 26, 2007

(87) PCT Pub. No.: WO2006/100377
PCT Pub. Date: Sep. 28, 2006

(65) Prior Publication Data
US 2008/0162016 A1  Jul. 3, 2008

(51) Int. Cl.
G06F 19/00 (2006.01)
F02M 51/00 (2006.01)
G01F 23/26 (2006.01)
(52) U.S. Cl. ................. 701/103; 123/494; 73/304 C
(58) Field of Classification Search ......... 701/101–103, 701/114, 115; 123/1 A, 494; 73/290 R, 304 R, 73/304 C
See application file for complete search history.

(56) References Cited

U.S. PATENT DOCUMENTS

| 4,953,390 A * | 9/1990 | Krempl et al. ........... 73/114.72 |
| 5,126,570 A | 6/1992 | Boos |
| 5,229,946 A | 7/1993 | Ghaem |
| 5,239,860 A | 8/1993 | Harris et al. |
| 5,262,645 A | 11/1993 | Lambert et al. |
| 5,349,189 A | 9/1994 | Maggard |
| 5,992,353 A * | 11/1999 | Posselt .................... 123/23 |
| 6,578,416 B1 * | 6/2003 | Vogel et al. ............ 73/304 C |

(Continued)

FOREIGN PATENT DOCUMENTS

EP 0 494 734 A2 7/1992

(Continued)

OTHER PUBLICATIONS

Monika Scherer et al., "Fluid Condition Monitoring Sensors for Diesel Engine Control," Sensors, 2004. Proceedings of IEEE Vienna, Austria, Oct. 24-27, 2004, Piscataway, NJ, USA, IEEE, Oct. 24, 2007, pp. 459-462.

*Primary Examiner*—Willis R Wolfe, Jr.
(74) *Attorney, Agent, or Firm*—DLA Piper LLP (US)

(57) ABSTRACT

A method for optimizing operation of an engine driven by an electronic or digital system incorporating at least one parameter or one law or one mapping for engine injection, combustion or post-treatment comprising analyzing fuel composition from at least one sensor located in a fuel circuit of an engine comprising a filling system, a fuel tank, a pump, a fuel filter, an engine fuel system and a return circuit to the fuel tank, and selecting or modifying the parameter, law or mapping for injection, combustion or post-treatment according to a result of the analysis, wherein the fuel composition analysis comprises, spectroscopic analysis of the molecular structure of the hydrocarbons composing the fuel.

25 Claims, 3 Drawing Sheets

U.S. PATENT DOCUMENTS 6,721,649 B2 * 4/2004 Knott et al. .................. 701/114
2004/0000275 A1 1/2004 McIntyre et al.
2008/0233438 A1 * 9/2008 Yagi et al. ..................... 429/13

FOREIGN PATENT DOCUMENTS

| | | | |
|---|---|---|---|
| FR | 2 542 092 A1 | 9/1984 |
| FR | 2 632 409 A1 | 12/1989 |
| WO | WO 94/08226 A1 | 4/1994 |
| WO | WO 99/02973 A1 | 1/1999 |

* cited by examiner

METHODS FOR OPTIMIZING THE OPERATION PARAMETERS OF A COMBUSTION ENGINE

RELATED APPLICATION

This is a §371 of International Application No. PCT/FR2006/000616, with an international filing date of Mar. 21, 2006 (WO 2006/100377 A1, published Sep. 28, 2007), which is based on French Patent Application No. 05/02825, filed Mar. 22, 2005.

Technical Field

This relates to methods for optimizing operation of heat engines driven by electronic or digital managing systems.

Background

An electronic or digital system is a powerful microprocessor which coordinates total management of an engine. The electronic or digital electronic system sets, analyzes and regulates the main functions of the engine.

The electronic or digital system is coupled to a series of sensors and detectors which permanently give information on the current working order, according to a set of parameters such as, for example, the temperature of the engine, the oil, the cooling liquid, the engine speed and external parameters such as the atmospheric pressure and the temperature of the ambient air.

The electronic or digital system compares such instantaneous values with the set values recorded in the mapping(s) and, using setting models and predefined characteristic curves, calculates the new set points for the following cycle. It more particularly can vary the quantity of fuel injected into the engine, set spark, setting the inlet fuel pressure, the recycling of emission gases or the injection time.

In fact, the mapping is composed of a multidimensional data base, stored and recorded in a specific memory. However, known electronic or digital systems do not take into account an essential parameter which makes it possible to enhance engine operation, i.e., the intrinsic quality of the fuel used with the engine.

It is known that the intrinsic quality of fuel directly affects performance, fuel consumption and the emission of pollutants and green house effect gases in the exhaust gases.

A. DOUAUD (1983) highlights the connection between the quality of gas, the engine settings and generation of the pinking phenomenon, in positive ignition engines. In 1987, J. C. GUIBET, in the reference book Carburants et Moteurs (Fuels and Engines), highlights the interactions between the quality of fuel and the engine, and their influence on the parameterization and setting models of the engine combustion. More recently, in 1997, A. GERINI analyzes the sensivity of a vehicle direct injection diesel engine to gas-oil parameters. Finally, in 2003, N. HOCHART provides a modelization of the pollutant emissions by present gas engines and diesel engines for light cars or heavy trucks by varying the quality of fuel by modifying the refining bases used in mixtures.

The quality and the composition of fuels, although they are defined by standards, specifically standards EN 590 and EN 228 in Europe, vary in time, in filling stations. Quality fluctuates according to the deliveries, the distributors, the seasons and the prevailing rules and laws. It is thus estimated that the fuel physico-chemical characteristics can vary by 15 to 40%, or more, around the average values defined in standards.

Engine timing operations on test benches (injection, combustion and post-treatment mappings and laws) are performed on a series of standardized fuels. For this purpose, engine manufacturers use the available standardized physico-chemical properties representing fuels, such as:
  the research octane number and the engine octane number for gas engines
  the cetane number for diesel engines
  the distillation curve
  the vapor pressure or tension for gas engines
  the flash point for diesel engines
  the resistance to cold (cloud point, pour point and filterability limit temperature) for diesel engines
  the density
  the oxygen compound contents.

Engine manufacturers agree that such values are not sufficient to make precision settings on engines, because such values represent the fuel qualities, but do not take the "fuel-engine" adequacy into account. It can be mentioned, for example, that the research and engine octane numbers are irrelevant for solving the "pinking" problem. Such numbers are measured on a standardized engine developed more than 50 years ago, which is no longer well adapted to carry the information required by an engine of the 21st century.

Besides, it has been demonstrated that the road octane number of the fuel depends on:
  the fuel used
  the vehicle engine
  the experimental conditions, for example, engine speed.

In 1971, it was demonstrated (Williams G. R., LAGARDE F., and HORNBECK D. D., "Etude des paramètres carburant affectant le cliquetis à haute vitesse des moteurs à combustion interne" (Research on the fuel parameters which affect the high speed pinking of internal combustion engines) Ingénieurs de l'Automobile, August-September 1971) that the road octane number of the same fuel, tested on various vehicles, varies by more than 12 points.

Similarly, in 1975, a study on the behavior of various fuels on the same engine (Duval A., Guibet J. C., "Etude expérimentale du cliquetis a haut régime" (Experimental study on high speed pinking), Revue de l'Institut Francais du Pétrole, May-June 1975) shows that the effect of the fuel on the engine affects the road octane number by more than 6 points.

Thus, because the physico-chemical properties and qualities are irrelevant and because the fuels in filling stations greatly vary, the fuel engine couple cannot be totally optimized, at present.

To take this variation into account and also to compensate for the irrelevancy of the currently available qualitative information, manufacturers make numerous concessions in the course of electronic or digital system development so as not to damage the vehicle and have the lowest possible consumption, while conforming with laws on emission gases.

This is the reason why manufacturers provide an important safety margin to compensate for the not particularly good quality of fuels and why the mass produced electronic or digital system provided when buying a car is only a compromise.

This is the reason why the pre-recorded models and mappings are generally created to ensure a "fairly good" efficiency throughout the operating range of the engine and are based on the average composition and quality of fuels in countries grouped in geographical zones where the cars are sold.

Anti-pollution standards however are stricter and car manufacturers keep trying to reduce the regulated emissions in the exhaust gases, such as carbon dioxide, for each car sold, throughout its service life without this being at the expense of engine performance. Thus, there exists a need for improving the engine setting by taking into account the intrinsic quality of the fuel in the tank. Qualitative parameters to be taken into account should be distinct from the standardized physico-chemical properties by a greater relevance for improving the engine setting.

FR 2 542 092 concerns a method for determining the composition of a fuel-alcohol mixture for the regulation of an engine. It is limited to the analysis of fuels of the gasoline type to which alcohol has been added and provides only a quantitative and not a qualitative measurement. It is thus limited since it determines the percentage of alcohol in the fuel.

The same is true for U.S. Pat. No. 5,126,570, U.S. Pat. No. 5,262,645 and U.S. Pat. No. 5,239,860, the applications of which are limited in the description of such method to the quantitative measurement of an alcohol concentration in a gasoline-alcohol mixture by a near infra-red process.

WO 94/08226 concerns an on-board method for determining fuel properties by a near infra-red spectroscopy. It is limited to the standardized physico-chemical properties which have little relevance to the engine setting. Besides, using near infra-red spectroscopy to determine the physico-chemical qualities of the fuel employs a model calibration step. Such calibration is crucial for the accuracy of the predictions as well as for the strength of the models.

Since the end of the 1970s, numerous chimiometrics works and publications give the near infrared spectroscopy theory, instruments and the methodologies to be implemented to develop models for correlating and predicting liquid properties from their near infra-red spectra, from mathematical and statistical models. However, specialists in chimiometrics applied to the near infra-red all agree on the fact that a model is solid and accurate only within the limited variation range depending on the sampling schedule. Building a universal, sufficiently robust and accurate model for the commercially available fuels in a country, a continent or the whole world should not be envisaged based on the prediction of the physico-chemical properties. This finding limits the scope of WO 94/08226, the method of which would be applicable with difficulty.

The same is true regarding "Fluid condition Monitoring Sensors for Diesel Engine Setting," the application fields of which are limited to a quantitative measurement by spectroscopy of a concentration in Esters (oxygen compounds) in a gas-oil-ester mixture.

Finally, U.S. 2004/000275, which concerns an on-board method for measuring the fuel quality to improve the engine setting, is limited to the standardized physico-chemical properties and has only a limited relevancy for the engine setting. Besides, it does not describe a feasible on-board method for measuring said properties.

It could therefore be advantageous to provide a method for optimizing the engine operation comprising a step of a relevant qualitative analysis of the fuel based on the analysis of the fuel components molecular structure. Such an analysis could make it possible for the electronic or digital system to set, in real time and as well as can be, the parameters, laws and mappings of the engine injection, combustion and post-treatment, according to the measured results.

SUMMARY

We provide a method for optimizing operation of an engine driven by an electronic or digital system incorporating at least one parameter or one law or one mapping for engine injection, combustion or post-treatment including analyzing fuel composition from at least one sensor located in a fuel circuit of an engine including a filling system, a fuel tank, a pump, a fuel filter, an engine fuel system and a return circuit to the fuel tank, and selecting or modifying the parameter, law or mapping for injection, combustion or post-treatment according to a result of the analysis, wherein the fuel composition analysis includes spectroscopic analysis of the molecular structure of the hydrocarbons composing the fuel.

BRIEF DESCRIPTION OF THE DRAWINGS

Further objectives and advantages will become apparent from the following description made with reference to the appended drawings.

DETAILED DESCRIPTION

We provide a method for optimizing the operation of a heat engine set by an electronic or digital system incorporating at least one parameter or one law or one mapping for the engine injection, combustion or post-treatment, the method including a step of analysis of the fuel composition from at least one sensor located in the fuel circuit of the engine, comprising the filling system, the fuel tank, the pumps, the fuel filters, and the engine fuel system and a return circuit to the fuel tank, and a step of selection or modification of said parameter, law or mapping for the injection, combustion or post-treatment, according to the result of said analysis, said method being characterized in that the step of the fuel composition analysis comprises a step of spectroscopic analysis of the molecular structure of the hydrocarbons composing the fuel.

Such a method makes it possible to obtain a universal measurement of the fuel quality through the determination of its molecular structure. Thus, neither one nor several standardized physico-chemical property/properties of the fuel is determined and the problems inherent to the use and modelization of the standardized physico-chemical properties, such as octane numbers, cetane numbers, steam pressure, distillation curve, and oxygenates contents are overwhelmed.

The spectroscopic analysis may consist of a near infra-red analysis of the fuel. Near infrared is especially well suited to the analysis of the molecular structure in that near infrared is a very responsive method and the near infra-red spectrum can be considered as the product DNA. The molecular structure extracted through this spectrum is very valuable for the engine setting. Besides, the near infra-red can particularly easily be repeated.

Figure 1:
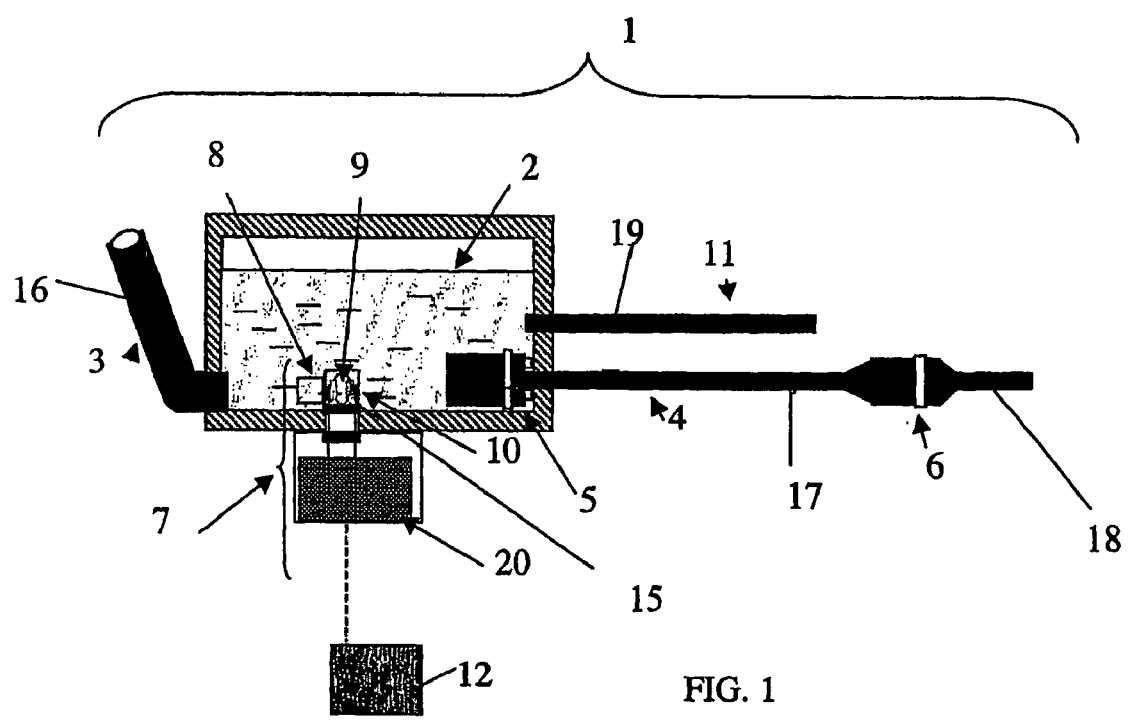
FIG. 1 is a schematic diagram of the fuel feed circuit of a heat engine wherein the method is implemented with a first structure of the sensor.

Reference works on near infrared, such as L. G. WEYER's, published in 1985 or the "Handbook of near infrared analysis," published in 1992, or more specific publications such as spectroscopic applications in petrochemistry and refining, as presented in articles by Jérôme WORKMAN Jr in 1996 or M. VALLEUR in 1999 can be cited Referring to FIG. 1, a method for optimizing the operation of a heat engine driven by parameters, laws and mappings of the engine injection, combustion or post-treatment is described.

The combustion engine is supplied with fuel by the fuel circuit 1, comprising a fuel tank 2, a tank filling system 3 and a fuel circuit 4. The circuit includes, for example, one or more fuel pumps 5, one or more fuel filters 6, and a return circuit to the fuel tank 11. The method is adapted to any type of fuel (gas, liquefied gas, gasoline, kerosene, gas-oil, fuel oil or the like) meeting the standards on fuels and bio fuels, whether additive or not, the main components of which are carbon, hydrogen and oxygen.

The method includes selecting or modifying the parameters, laws or mappings for the engine injection, combustion or post-treatment according to the fuel molecular structure. For this purpose, the molecular structure of the fuel feeding the engine is analyzed, using a spectroscopic analysis of the hydrocarbons composing the fuel. Determining such structure includes measuring the interactions between an electromagnetic radiation and the material composing the fuel.

The spectroscopic analysis includes a near infrared analysis of the fuel composition. It could also include a near-, medium and/or far infrared spectroscopic analysis and/or a NMR analysis and/or an ultraviolet spectroscopic analysis or several analyses carried out simultaneously, according to the same principle.

The near infrared analysis is described hereunder:

A spectroscopic sensor 7 is located in the fuel circuit 1 and connected to the electronic or digital system of the engine. In the case of a near infrared analysis, the sensor 7 is composed of a light source 8, a light separation system, a fuel sampling cell 9, a photosensitive detection system 10 and a dedicated computer 20. The dedicated computer 20 makes it possible to set the measuring sequences to adjust and set the correct operation of the sensor 7. The computer 20 can contain the models making it possible to perform all the calculations associated with the treatment of the near infrared spectrum. In the case of near infrared, the sensor 7 may equally include only one source and only one detector or several light sources and only one detector. In the case of dispersive or non-dispersive near infrared, it can use an instrument which includes a polychromatic infrared light source or infrared emitting diodes, interference or crystal mains filters or a Fourier Transform system. The sensor 7 may be a multiple- or sequential access sensor. Models can be accommodated in one or more existing or dedicated computers.

Figure 2:
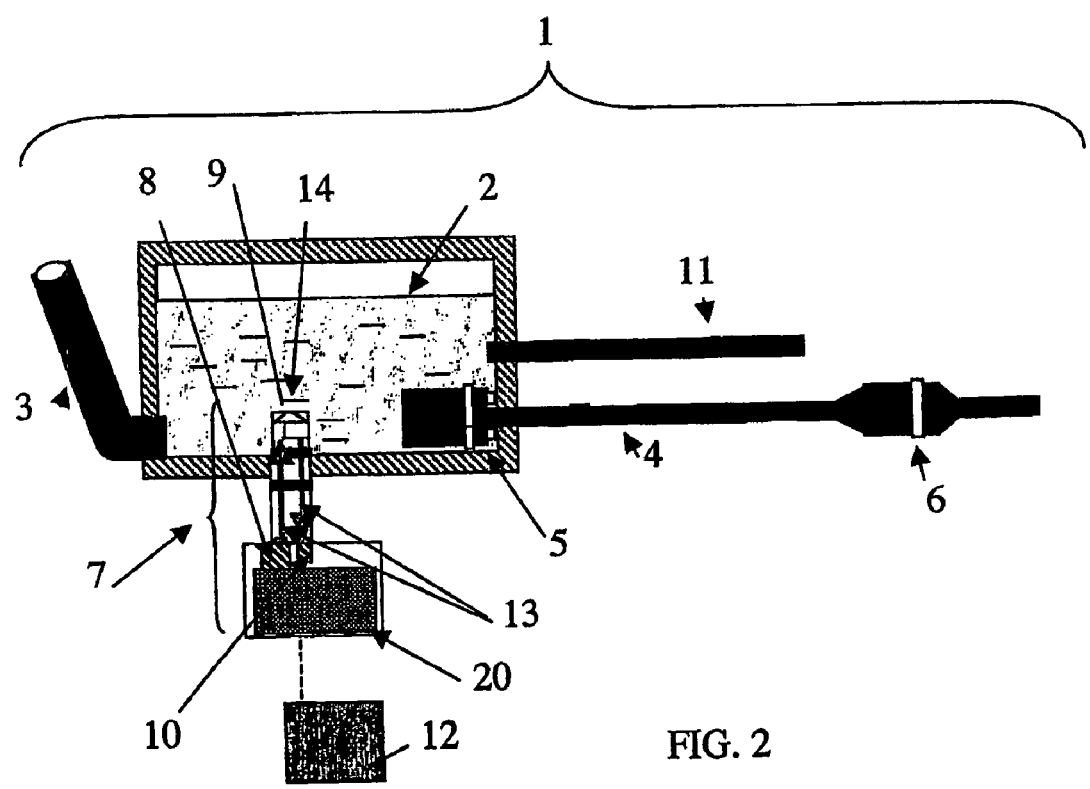
FIG. 2 is a schematic diagram similar to FIG. 1, with a second structure of the sensor.

According to another representative structure shown in FIG. 2, it is possible to use adapted optic fibers 13 and optical centering probe 14 to move the sampling system of the other components of the spectrometer.

The sensor 7 may be a near infrared spectrometer with an array composed of several hundreds of high-sensitivity photodiodes which each record the light intensity for a given wave length. The detector composing the sensor 7 is a semiconductor based on silicon (Si) or a high sensitivity complex type alloy (InGaAs, InAs, InSb, PbS, PbSe). The detector may be cooled or not.

The sensor 7 may be positioned in the tank 2 (position 15 in FIGS. 1 and 2), at the tank filling system 3 (position 16 in FIGS. 1 and 2), in the engine fuel feed circuit 4. In the latter case, the sensor 7 may be positioned between the pump 5 and the filter 6 (position 17) or behind the filter 6 (position 18). The sensor may also be located in the fuel return circuit 11 (position 19).

The sensor is arranged to take measures in the spectral regions between about 780 nm and about 2,500 nm (12,820 cm$^{-1}$ and 4,000 cm$^{-1}$). For example, successive measurement ranges between about 780 nm and about 1,100 nm (12,820 cm$^{-1}$ and 9,090 cm$^{-1}$), about 1,100 nm and about 2,000 nm (9,090 cm$^{-1}$ and 5,000 cm$^{-1}$) and about 2,000 nm and about 2,500 nm (5,000 cm$^{-1}$ and 4,000 cm$^{-1}$) can be provided for.

For this purpose, the sampling system is arranged to have an optical path, i.e., a thickness of the measuring cell through which the measure is taken, between about 0.5 millimeters and about 100 millimeters, i.e., optical paths corresponding to the wave lengths ranges of about 10 millimeters to about 100 millimeters in the first case, about 1 millimeter to about 20 millimeters in the second case and about 0.5 millimeters to about 10 millimeters in the last case.

The sensor 7 is arranged to measure the reflectance, transmittance or absorbance of the near infrared spectrum of the fuel circulating in the fuel feed circuit 1 of the engine.

The sensor 7 has a spectral resolution, (accuracy) adjustable from about 1 cm$^{-1}$ to about 20 cm$^{-1}$, preferably about 4 cm$^{-1}$.

The optical and sampling system of the sensor 7 may also be self-cleaning, which avoids having to disassemble it for cleaning purposes.

The table addressed by the engine computer to the electronic box, forming the electronic or digital system 12 managing the engine operation, is a multiple entry matrix connecting a specific indicial marker of the fuel molecular structure related to the presence of pure hydrocarbon families in said fuel, and parameters, laws and mappings of the engine injection, combustion and post-treatment.

The hydrocarbon families can be classified, for example, in:

saturated hydrocarbons (linear or branched open carbon chain or closed chain alkanes);

unsaturated hydrocarbons (open or closed chain olefins containing one or more double bonds);

aromatic hydrocarbons (one or more unsaturated cycles with a benzene ring);

oxygen enriched organic products: Molecules containing at least one atom of oxygen (alcohols, aldehydes, ketone, esters, ethers, acids . . . ).

For example, absorbance of the fuel near infrared spectrum is measured in the zones having the considered wave lengths. The values of absorbance measured for each selected wave length are introduced into the mathematical and statistical universal models which have been previously calibrated on a reference data base, according to known chemometrics rules to supply information to the double entry matrix, to calculate the molecular structures.

An exemplary double entry table, addressed by the computer, is given in the table hereunder. This table is that obtained for gasoline, corresponding to standard EN 228.

| Fuel EN 228 Lines (i) | Column (n) Indicial markers/weighting | A gas | B light | C medium | D heavy |
|---|---|---|---|---|---|
| 1 | Linear markers | 2.4 | 0.4 | 0 | 1.0 |
| 2 | Branched markers | 0 | 2.7 | 0 | 32.5 |
| 3 | Unsaturated markers | 0 | 5.3 | 0 | 0 |
| 4 | Aromatic markers | | 0 | 25.6 | 6.9 |
| 5 | Cyclic markers | | 0.3 | 0 | 5.5 |
| 6 | Oxygen markers | | 0 | 0 | 17.4 |

The linear marker corresponds to the impact relating to the presence of the linear open carbon chain saturated hydrocarbon families in the "fuel-engine" couple adequacy.

The branched marker corresponds to the impact relating to the presence of the saturated hydrocarbon families in the "fuel-engine" couple adequacy.

The unsaturated marker corresponds to the impact relating to the presence of the open carbon chain unsaturated hydrocarbon families having branches in the "fuel-engine" couple adequacy.

The cyclic marker corresponds to the impact relating to the presence of the closed carbon chain saturated hydrocarbon families in the "fuel-engine" couple adequacy.

The aromatic marker corresponds to the impact relating to the presence of the aromatic hydrocarbon families in the "fuel-engine" couple adequacy.

The oxygen marker corresponds to the impact relating to the presence of the oxygen organic products in the "fuel-engine" couple adequacy.

The four weighting criteria Gas, Light, Medium and Heavy are calculated with respect to the number of carbon atoms weighted by one or more of the physical properties, such as combustion enthalpies or vaporization of the pure products composing the fuel, for example.

In the case of the gasoline EN 228 mentioned as an example, the GAS column groups hydrocarbons the carbon number of which is less than 4 atoms.

The LIGHT column groups hydrocarbons the carbon number of which is between 5 and 6 atoms.

The MEDIUM column groups hydrocarbons the carbon number of which is between 7 and 8 atoms.

The HEAVY column groups hydrocarbons the carbon number of which is equal to or greater than 9.

The fuel molecular structure is thus precisely known thanks to the indices at the intersections of columns n and lines i. Such information is previously incorporated during the engine timing and the electronic or digital system is adapted to be able to use such information and optimize them in the parameters, laws and mappings for the engine injection, combustion or post-treatment.

In the vehicle, during the on-board analysis of the fuel molecular structure by sensor 7, the electronic or digital system receives updated information on the molecular structure of the fuel in the tank, which makes it possible to select or modify the settings, laws and mappings, so as to optimize the settings according to the fuel feeding the engine.

The best parameters, laws and/or mappings for the engine injection, combustion or post-treatment are chosen by the electronic or digital system according to the usual information to be read on the various sensors and detectors, and also on sensor 7, which now gives information on the fuel molecular structure.

The parameters, laws and mapping of the engine may be chosen to optimize fuel consumption and limit exhaust gases emissions to engine iso performance or for increasing engine performance to iso consumption and emissions.

A step of storage of information relating to the fuel molecular structure analysis is used to have a history of such molecular structure.

Default models of parameters, laws and/or mappings of the engine injection, combustion and post-treatment are created from the history of the fuel molecular structure.

Thus, in the absence of information read by sensor 7, the parameters, laws and/or mappings of the engine injection, combustion and post-treatment are selected by default according to the history of the fuel molecular structure. Such history makes it possible to create a moving average, on one or more lapsed time period/periods, of the fuel molecular structure. The parameters, laws and/or mappings of the engine injection, combustion and post-treatment are selected according to the most relevant moving average.

Measurements can be performed at regular time intervals by sensor 7. A detector for the volume of fuel in the tank 2 can also be provided. The starting of the measuring operation can then be instructed to occur each time the driver fills the tank.

Figure 3:
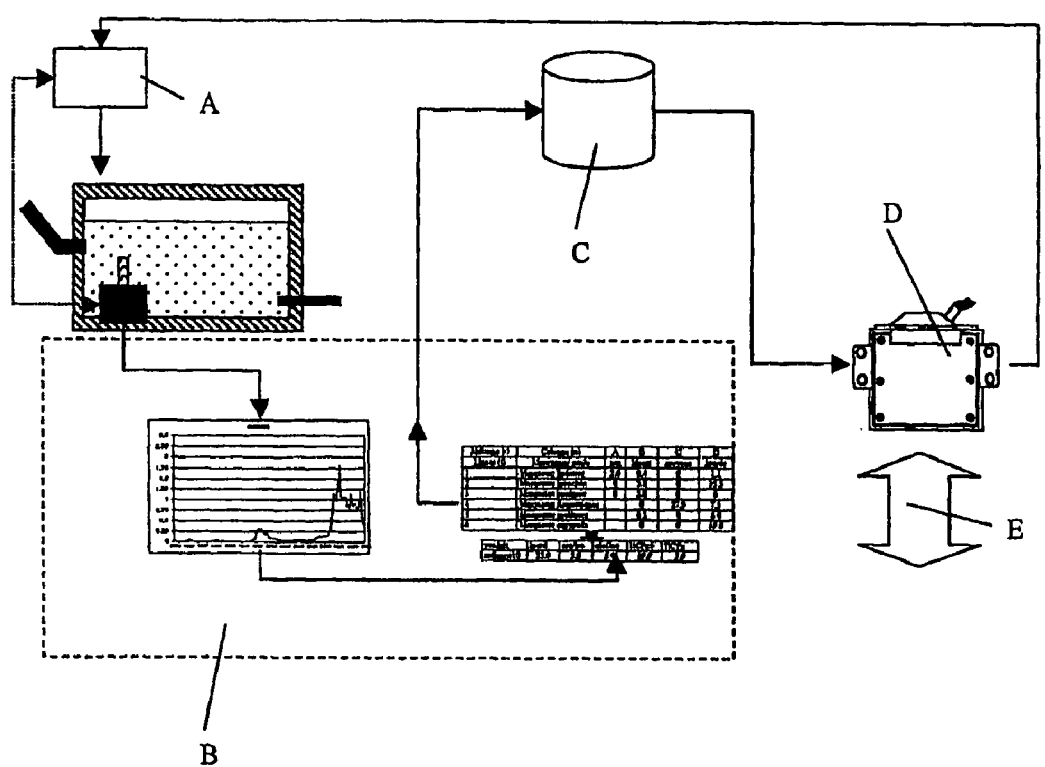
FIG. 3 is a diagram showing the method steps and, more particularly, the steps of engine analysis and setting.

FIG. 3 shows the various steps of the method:
step A: Starting the measuring operation;
step B: Step of analysis according to the measuring operation;
step C: Comparing the table obtained with the reference table;
step D: Selection or modification of suitable parameters, laws and/or mappings;
step E: Engine setting with respect to the suitable parameters, laws and/or mappings.

The invention claimed is:

1. A method for optimizing operation of an engine driven by an electronic or digital system incorporating at least one parameter or one law or one mapping for engine injection, combustion or post-treatment comprising:
analyzing fuel composition from at least one sensor located in a fuel circuit of an engine comprising a filling system, a fuel tank, a pump, a fuel filter, an engine fuel system and a return circuit to the fuel tank by determining the molecular structure of the fuel comprising spectroscopic analysis of the molecular structure of the hydrocarbons composing the fuel, and
selecting or modifying the parameter, law or mapping for injection, combustion or post-treatment according to a result of the analysis.

2. The method according to claim 1, wherein molecular structure analysis includes measuring interactions between electromagnetic radiation and the material composing the fuel.

3. The method according to claim 1, wherein the settings of the parameters, laws and mapping of the engine injection, combustion and post-treatment optimize fuel consumption and limit exhaust gases emissions to engine iso performance or for increasing engine performance to iso consumption and emissions.

4. The method according to claim 1, wherein measuring comprises addressing at least one table including criteria values indicating the molecular structure of the fuel to the electronic or digital system which sets the parameters, laws and mappings of the engine injection, combustion and post-treatment.

5. The method according to claim 4, wherein the table is a single— or multiple entry matrix connecting a specific indicial marker of the fuel molecular structure related to the presence of a pure hydrocarbon family in said fuel, and the parameters, laws and mappings of the engine injection, combustion and post-treatment.

6. The method according to claim 1, further comprising storing data on the fuel molecular structure to have a history of the composition.

7. The method according to claim 6, wherein default models of mapping, parameters and laws of the engine injection, combustion and post-treatment are created from the history of the fuel molecular structure.

8. The method according to claim 1, wherein measuring electromagnetic interactions includes a near, medium and/or far infrared spectroscopic analysis and/or ultraviolet spectroscopic analysis and/or a NMR spectroscopic analysis.

9. The method according to claim 8, wherein the spectroscopic analysis uses a spectroscopic sensor.

10. The method according to claim 9, wherein the spectroscopic sensor is a near infrared sensor.

11. The method according to claim 10, wherein the infrared sensor is arranged to take measurements in spectral regions between about 780 nm and about 2,500 nm.

12. The method according to claim 10, wherein the sensor is arranged to have an optical path or measuring cell thickness between about 0.5 nm and about 100 nm.

13. The method according to claim 10, wherein the sensor is arranged to have a spectral resolution from about 1 $cm^{-1}$ to about 20 $cm^{-1}$.

14. The method according to claim 10, wherein the sensor comprises a light source, a sampling cell, an optical light processing system, a detector and a computer.

15. The method according to claim 10, wherein the sensor comprises an optical centering probe and optical fibers.

16. The method according to claim 10, wherein the sensor comprises an instrument including a plurality of band infrared emitting diodes.

17. The method according to claim 10, wherein the sensor comprises an instrument including a detector composed of high photosensitive diodes.

18. The method according to claim 10, wherein the sensor comprises an instrument including a polychromatic infrared light source.

19. The method according to claim 10, wherein the sensor comprises an instrument including a wave length selection system.

20. The method according to claim 10, wherein the sensor comprises a Fourier Transform instrument.

21. The method according to claim 10, wherein the sensor is self-cleaning.

22. The method according to claim 10, wherein the sensor is located on or after the fuel filter.

23. The method according to claim 10, wherein the sensor is located in the fuel tank filling system.

24. The method according to claim 10, wherein the sensor is located in the fuel tank.

25. The method according to claim 10, wherein the sensor is located in the return circuit.

* * * * *